US012744428B2

(12) United States Patent
García Urbieta et al.

(10) Patent No.: US 12,744,428 B2
(45) Date of Patent: Sep. 22, 2026

(54) ROTOR ASSEMBLY FOR AN ELECTRIC EXCITED SYNCHRONOUS MOTOR (EESM)

(71) Applicant: GKN Automotive Limited, Birmingham (GB)

(72) Inventors: Jon García Urbieta, Zumaia (ES); Iñigo García Sierra, Zumaia (ES); Miguel González, Zumaia (ES); Sergio Armentia, Zumaia (ES); Oscar Baonza, Zumaia (ES); Aitor Gómez, Zumaia (ES)

(73) Assignee: GKN Automotive Limited, Birmingham (GB)

( * ) Notice: Subject to any disclaimer, the term of this patent is extended or adjusted under 35 U.S.C. 154(b) by 206 days.

(21) Appl. No.: 18/676,651

(22) Filed: May 29, 2024

(65) Prior Publication Data

US 2024/0429783 A1 Dec. 26, 2024

(30) Foreign Application Priority Data

Jun. 23, 2023 (DE) ..................... 10 2023 116 635.2

(51) Int. Cl.
*H02K 9/19* (2006.01)
*H02K 1/24* (2006.01)
*H02K 1/32* (2006.01)

(52) U.S. Cl.
CPC ................. *H02K 9/19* (2013.01); *H02K 1/24* (2013.01); *H02K 1/32* (2013.01)

(58) Field of Classification Search
CPC ............... H02K 1/24; H02K 1/32; H02K 1/19
USPC ........................................ 310/52, 54, 58, 64
See application file for complete search history.

(56) References Cited

U.S. PATENT DOCUMENTS 6,234,767 B1 * 5/2001 Takeda ..................... H02K 9/06 417/366
11,011,960 B2 5/2021 Do et al.
12,500,483 B2 * 12/2025 Yagyu .................... H02K 5/203
(Continued)

FOREIGN PATENT DOCUMENTS

CN 114567102 A 5/2022
DE 102021111321 A1 11/2022
(Continued)

OTHER PUBLICATIONS

DE Office Action for DE Application No. 102023116635.2 dated Feb. 24, 2025 (6 pages).

*Primary Examiner* — Rashad H Johnson
(74) *Attorney, Agent, or Firm* — Reising Ethington P.C.

(57) ABSTRACT

A rotor assembly for an electric excited synchronous motor (EESM) comprises: a rotor shaft, a rotor core with windings, a first and a second fluid guide element arranged at the ends of the rotor core, wherein the rotor shaft comprises an axial bore and a plurality of radial bores, wherein the rotor core includes a plurality of inlet openings fluidically connected to the radial bores, and axial channels extending axially to first and second outlet openings of the rotor core, wherein the first and second fluid guide elements are fluidically connected to the outlet openings of the rotor core and comprise a fluid structure configured to receive cooling fluid from the rotor core and guide same to escape openings arranged in circumferential direction between two circumferentially adjacent winding ends of the rotor.

16 Claims, 6 Drawing Sheets

(56) References Cited

U.S. PATENT DOCUMENTS

| | | | | |
|---|---|---|---|---|
| 2015/0171707 | A1* | 6/2015 | Shoykhet | H02K 9/12<br>310/54 |
| 2016/0211712 | A1 | 7/2016 | Patel et al. | |
| 2019/0140494 | A1* | 5/2019 | Lan | H02K 1/16 |
| 2020/0373812 | A1* | 11/2020 | Li | F03D 1/04 |
| 2021/0203202 | A1* | 7/2021 | Yagyu | H02K 1/278 |
| 2022/0178371 | A1* | 6/2022 | Lee | F04C 18/0215 |
| 2023/0179051 | A1* | 6/2023 | Siepker | H02K 1/24 |
| 2024/0171043 | A1* | 5/2024 | Krank | H02K 9/19 |
| 2024/0291336 | A1* | 8/2024 | Geimer | H02K 1/32 |
| 2024/0429783 | A1* | 12/2024 | García Urbieta | H02K 9/19 |

FOREIGN PATENT DOCUMENTS

| | | | |
|---|---|---|---|
| DE | 102021213812 | A1 | 6/2023 |
| EP | 3501085 | B1 | 6/2019 |
| FR | 3059487 | A1 | 6/2018 |
| KR | 10-1967731 | B1 | 4/2019 |
| WO | 2018095842 | A1 | 5/2018 |
| WO | 2021232835 | A1 | 11/2021 |

* cited by examiner

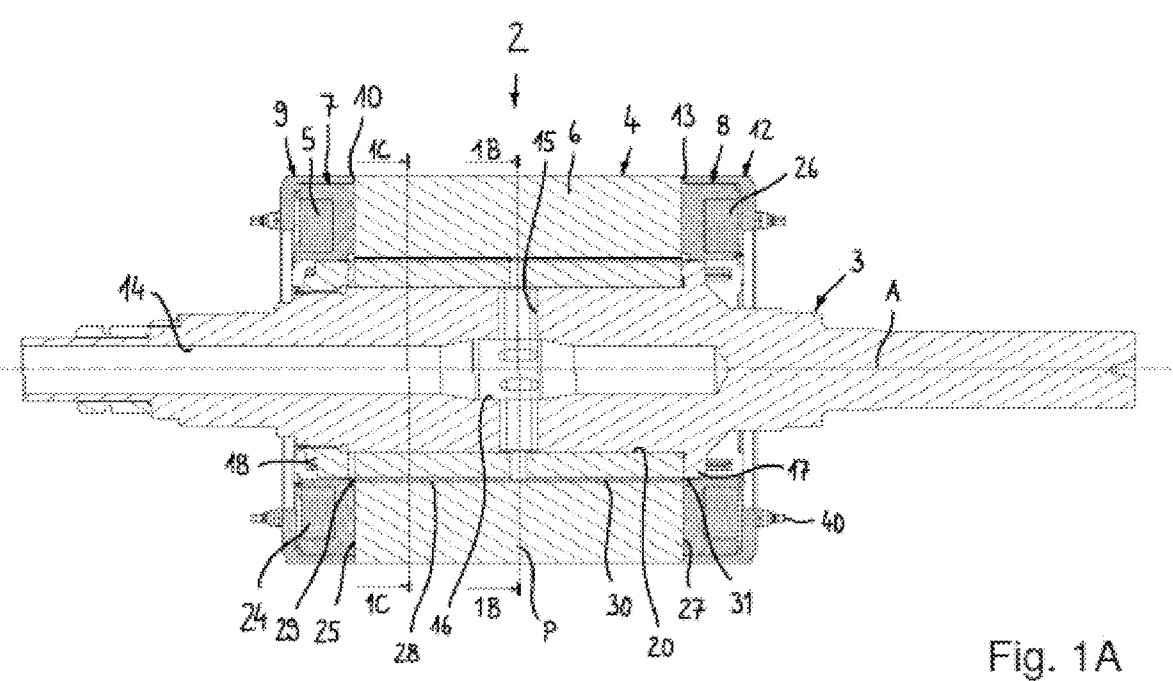
Fig. 1A
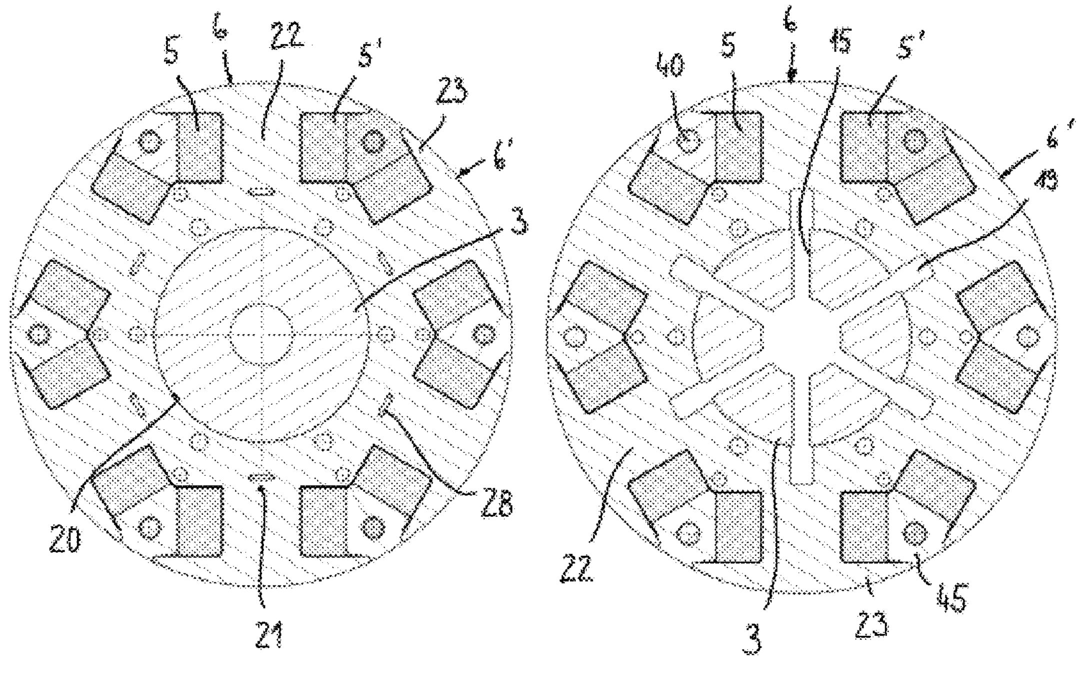
Fig. 1C
Fig. 1B 4
6
9
12
24
26
14
3
15
F

24
F
49
38
29
6
45
33
34
F 24
43
46
F
42
9

ROTOR ASSEMBLY FOR AN ELECTRIC EXCITED SYNCHRONOUS MOTOR (EESM)

CROSS-REFERENCE TO RELATED APPLICATIONS

This application claims priority to German Patent Application No. DE 10 2023 116 635.2, filed on Jun. 23, 2023, which application is hereby incorporated herein by reference in its entirety.

BACKGROUND

In an electric excited synchronous motor (EESM), the rotation of a shaft is synchronized with the frequency of the supply current. The rotation period is equal to an integral number of the alternating current (AC) cycles. Synchronous motors may use electromagnets as the stator to create a magnetic field that rotates in time with the oscillations of the current. The rotor may be provided with permanent magnets or electromagnets and turns in step with the stator field at the same rate. As a result, the rotor provides a synchronized rotating magnet field.

From WO 2021/232835 A1, an electric motor is known with a rotor and a stator. The rotor comprises a rotating shaft, a rotor core, and a plurality of rotor coils. The rotor core is provided with a plurality of winding holes at intervals around the rotating shaft. A gap is formed between two adjacent rotor coils, and a first shaft hole is formed in the rotating shaft. The gap is configured to be a first heat dissipation channel in communication with the first shaft hole, and the first heat dissipation channel is used for a cooling liquid which flows into the rotating shaft. In this way, the cooling liquid is introduced into the rotating shaft from the outside, enters the first heat dissipation channel from the first shaft hole under centrifugal force for heat dissipation of the rotor coils.

From U.S. Pat. No. 11,011,960 B2, a wound rotor motor is known, in which a rotary shaft is arranged in the vertical direction, to immerse lower coil portions of a stator and a rotor in cooling oil. The rotary shaft has therein a flow passage, through which cooling oil moves up from the region below the rotor and is sprayed to the region above the rotor by centrifugal force generated by rotation of the rotor.

From KR 10-1967731 a wound-type excitation motor is known, including a supporting and cooling member for a coil. The motor includes: a rotor with a plurality of cores protruding radially from a center, field coils wound around each of the cores, and a plurality of cooling and supporting members having a cooling structure for discharging heat generated inside the rotor to the outside. The cooling and supporting members are included, so that the coil wound around the core of the rotor is firmly supported, and forced convection of air inside the rotor is generated, thereby discharging heat generated in the rotor to the outside to maximize cooling performance.

From WO 2018 095842 A1, corresponding to FR 3 059 487, a wound rotor is known, comprising a shaft with circumferentially alternating teeth and grooves, with each tooth receiving a longitudinal winding intended to produce a rotor pole. Each winding defines, at each longitudinal end of the rotor, a protruding coil head. The rotor comprises at least one collar for mechanically holding the rotor windings, with the collar being installed at a longitudinal end of the rotor to define a central opening towards the coil heads. The collar has at least one escape duct to allow coolant flowing into the central opening to be provided onto the coil heads.

From CN 114567102 A, an oil-cooled motor rotor cooling structure is known. The motor comprises a rotor with a shaft, a plurality of rotor core assemblies, a rotor end plate, and an oil guide plate. The two axial ends of the rotor iron core are covered with rotor end plates respectively. The end face, facing the rotor iron core, of the rotor end plate is provided with a plurality of first heat dissipation oil ways which are communicated outwards in the radial direction. A plurality of first oil spraying openings are annularly distributed in the outer ring circumference of the rotor end plate and communicated with the radial outer ends of the first heat dissipation oil ways.

EESMs are becoming more popular, such as to replace mid to high power permanent magnet synchronous motors (PMSM), and thus to avoid heavy rare earth (HRE) magnets. However, the performance of an EESM is limited by the temperature in the winding of the rotor and the stator. Regular EESMs with indirect cooling systems such as housing water jacket or even direct air-cooling systems have limited heat evacuation capabilities. In order to cope with the increasingly demanding performance requirements, more advanced and effective direct cooling systems are necessary.

SUMMARY

The present disclosure relates to a rotor assembly for an electric excited synchronous motor (EESM), and an EESM with such a rotor assembly An EESM with such a rotor assembly can have good cooling properties and a long service life.

A rotor assembly for an electric excited synchronous motor (EESM) can comprise: a rotor shaft, a rotor core connected to the rotor shaft and including a plurality of circumferentially distributed pole portions, with windings being received around the pole portions respectively, wherein the windings have first winding ends that project axially from a first end face of the rotor core and, on the opposite side, second winding ends that project axially from a second end face of the rotor core, a first fluid guide element arranged at the first end face of the rotor core, a second fluid guide element arranged at the second end face of the rotor core, wherein the rotor shaft comprises an axial bore and, extending therefrom, a plurality of radial bores arranged in an axially central region of the rotor shaft, wherein the rotor core includes a plurality of inlet openings that are fluidically connected to the radial bores of the rotor shaft, and axial channels that extend from the inlet openings axially to first outlet openings at the first end face of the rotor core and to second outlet openings at the second end face of the rotor core, wherein the first fluid guide element is fluidically connected to the first outlet openings of the rotor core and comprises a fluid structure that is configured to receive cooling fluid from the first openings of the rotor core and guide the cooling fluid to first escape openings arranged in circumferential direction between two circumferentially adjacent first winding ends, and wherein the second fluid guide element is fluidically connected to the second outlet openings of the rotor core and comprises a fluid structure that is configured to receive cooling fluid from the second openings of the rotor core and guide the cooling fluid to second escape openings arranged in circumferential direction between two circumferentially adjacent second winding ends.

An advantage of the presently described rotor assembly is that a direct oil cooling system is provided that uses the centrifugal force caused by the rotation of the rotor to impulse cooling fluid through the rotor and to the end windings. Thus, a very low-pressure can be used to input the cooling fluid into the hollow shaft. Inside the shaft chamber, the cooling fluid distributes centrifugally and creates a flow along the inner walls of the shaft, then leaves the shaft through a set of ducts or radial bores that connect the shaft chamber to the channels that extend across the rotor core. Once the cooling fluid exits the rotor channels, it is fluidically connected to the fluid guide elements that are in contact with the rotor core, including with end faces of the rotor core. The fluid guide elements guide and release the cooling fluid outwards towards the winding ends of the rotor. The cooling fluid can be any fluid suitable to cool and/or lubricate the electric machine, for example an oil.

To supply cooling fluid into the rotor shaft, a supply element can be provided, including to extend into the axial bore of the rotor shaft. The supply element can be configured in form of a static lance, for example, that can be connected to a housing, or a carrier portion connected thereto. Compared to a rotary lance, the oil flow inside the static lance is not influenced by the rotational speed of the electric machine. No centrifugal force will be present inside the static lance, allowing a good control of the oil flow towards the shaft.

The plurality of radial bores is arranged in the central region of the rotor shaft. At least some of the plurality of radial bores of the rotor shaft can be arranged in a plane that lies axially within a central portion of the rotor core, for example within a central third of the rotor core. Providing the radial bores in a central region has the advantage the cooling fluid can flow from there to the first side and to the second side of the rotor core, thereby already absorbing heat from the rotor core.

The rotor core may optionally be composed of a plurality of laminated stacks. A central group of the rotor laminations can comprise the radial bores. The rotor laminations arranged axially adjacent the central group can have the same design among each other. The axial channels extend through all the laminated stacks to the axial ends of the rotor core, where cooling fluid can thus exit the rotor core. The number of radial bores and axial channels of the rotor core can correspond with the number of pole portions, respectively windings of the rotor assembly. The axial channels can be arranged circumferentially in the region of the pole portions, respectively windings, for example. However, a different number of channels and windings is also possible. The axial channels can be arranged radially between an inner circumferential face of the rotor core and a radial inner end of the pole portions for receiving the windings. In other words, the channels can be arranged radially inside the pole portions of the rotor core, including with an overlap in circumferential direction to the pole portions. The pole portions extend radially outwardly from a ring portion and can also be referred to as salient poles or web portion.

According to an example, the first and second guide elements can have the same design. Thus, the features described for one guide element (the first element) can also apply for the other guide element (the second element). A fluid guide element can include an annular channel fluidically connected with the outlet openings of the rotor core, and a plurality of fluid pockets fluidically connected to the ring channel and arranged at an inner circumferential face of the guide element. The escape openings are fluidically connected with a respective one of the fluid pockets. The annular channel of the fluid guide element can be arranged with a radial overlap relative to the side openings of the rotor core channels. Thus, the cooling fluid exiting the axial channels gathers in the annular channel of the fluid guide element, with a ring-shaped pool of cooling fluid being formed by the annular channel. The ring-shaped pool is fluidically connected with the fluid pockets, which respectively form an axial reservoir to centrifugally collect the cooling fluid before releasing it outwards by overflow.

The escape openings of the fluid guide element can have an axial extension of at least 0.25 times, or at least 0.5 times, or at least 0.75 times the axial length of the end windings projecting from the end face of the rotor core. In this way, the openings have a slot-like design, which, in connection with the reservoir-design, contributes to an axially wide oil cascade towards the winding ends of the rotor. Thus, effective cooling of the end windings can be achieved.

In an example, a fluid guide element can include a first ring portion and a plurality of winding support portions radially projecting from the first ring portion. The winding support portions can include head portions forming enlarged ends, so that the end windings are prevented from slipping off the support portions. The end windings embrace the winding support portions, i.e., enclose and/or engage a respective winding support portion. The winding support portions can be formed, in a cross-sectional view, correspondingly with the pole portions of the rotor core, i.e., so as to form a lateral extension of the pole portions. The windings, that can also be referred to as coils, extend respectively in a closed loop around an associated pole portion of the rotor core, the first winding support portion of the first fluid guide element and, at the opposite end, around the second winding support portion of the second fluid guide element. In an example with winding support portions, the fluid guide element fulfils two functions, i.e., to cool and to support the end windings. Thus, the fluid guide element may also be referred to as cooling element and/or support element.

A fluid guide element can be made of a non-conducting material, in particular a material that is different from the material of the rotor core. For example, a plastic material can be used for a fluid guide element. As noted, some or all of the configurations described above may apply to the first and/or second guide element.

In an example, a first end ring can be provided at the first side of the rotor core, and a second end ring can be provided at the opposite second side. The first and/or second end ring can be made of a metal material, in particular aluminium or an aluminium alloy, for example, without being limited thereto. The end rings can be mechanically connected to the rotor core, more particularly to the rotor stacks. In an implementation, the first and second end rings can be axially clamped against each other by a plurality of clamping or tensioning elements. The clamping elements can each be arranged in the circumferential direction between two windings. The first and/or second end ring can comprise a flange portion for supporting the tensioning elements and a jacket portion that substantially encloses the end windings. Thus, the end ring has an L-shaped form, if viewed in semi-longitudinal section. Furthermore, the end ring can include a plurality of land portions extending axially along on a radial inner circumference of the jacket portion. The tensioning members can extend axially through the land portions which can be respectively arranged between two circumferentially adjacent end windings.

In an example, the end ring can be formed to collect cooling fluid coming from the winding ends of the rotor, to effectively redirect the fluid towards the winding ends of a stator through some specifically located holes through the outer portion of the ring. The holes or openings allows cooling fluid flowing from the fluid guide elements to the end windings to be temporarily caught within the end ring, from where it escapes radially outwards through the openings and can be thrown through centrifugal forces against the stator before returning to the cooling system. The openings of the end ring can be arranged circumferentially offset relative to the escape openings of the respective fluid guide element.

The rotor core comprises a plurality of longitudinally extending recesses or slots for receiving the windings, with each recess formed between two circumferentially adjacent pole portions. In each longitudinal recess, a wedge element can be arranged between respectively two windings adjacent in circumferential direction. The wedges can be secured in the longitudinal recesses to prevent the rotor winding from being released from the winding slot through centrifugal forces.

Further disclosed is an electric excited synchronous motor (EESM) comprising: a housing, a stator arranged in the housing and comprising a stator core and a winding, and a rotor rotatably supported in the housing about an axis of rotation, with the rotor configured according to any one of the above examples. In this way, an EESM is provided that has very good cooling properties and thus a long service life.

BRIEF SUMMARY OF THE DRAWINGS

Examples are described below with reference to the drawings. Herein:

FIG. 1A shows a rotor assembly for an electric machine in a longitudinal section;

FIG. 1B shows the rotor assembly of FIG. 1A in a first cross-sectional view according to section line 1B-1B;

FIG. 1C shows the rotor assembly of FIG. 1A in a second cross-sectional view according to section line 1C-1C;

FIG. 3A shows the rotor assembly of FIG. 1A in a partially cut view with a cooling fluid flow drawn in;

FIG. 3B shows the rotor assembly of FIG. 1A in a modified example;

FIG. 4 shows a detail of the rotor assembly of FIG. 1A in a perspective view of one end portion of the assembly, partially cut;

FIG. 5A shows a detail of the rotor assembly of FIG. 1A in a perspective view onto a side of the fluid guide element facing the rotor core;

FIG. 5B shows a fluid guide element of the rotor assembly of FIG. 1A as a detail, partially cut;

FIG. 5C shows a section of the fluid guide element of FIG. 5A in a cross-sectional view;

FIG. 5D shows an axial view of the fluid guide element of FIG. 5C with a cooling fluid flow drawn in;

DESCRIPTION

Figure 2:
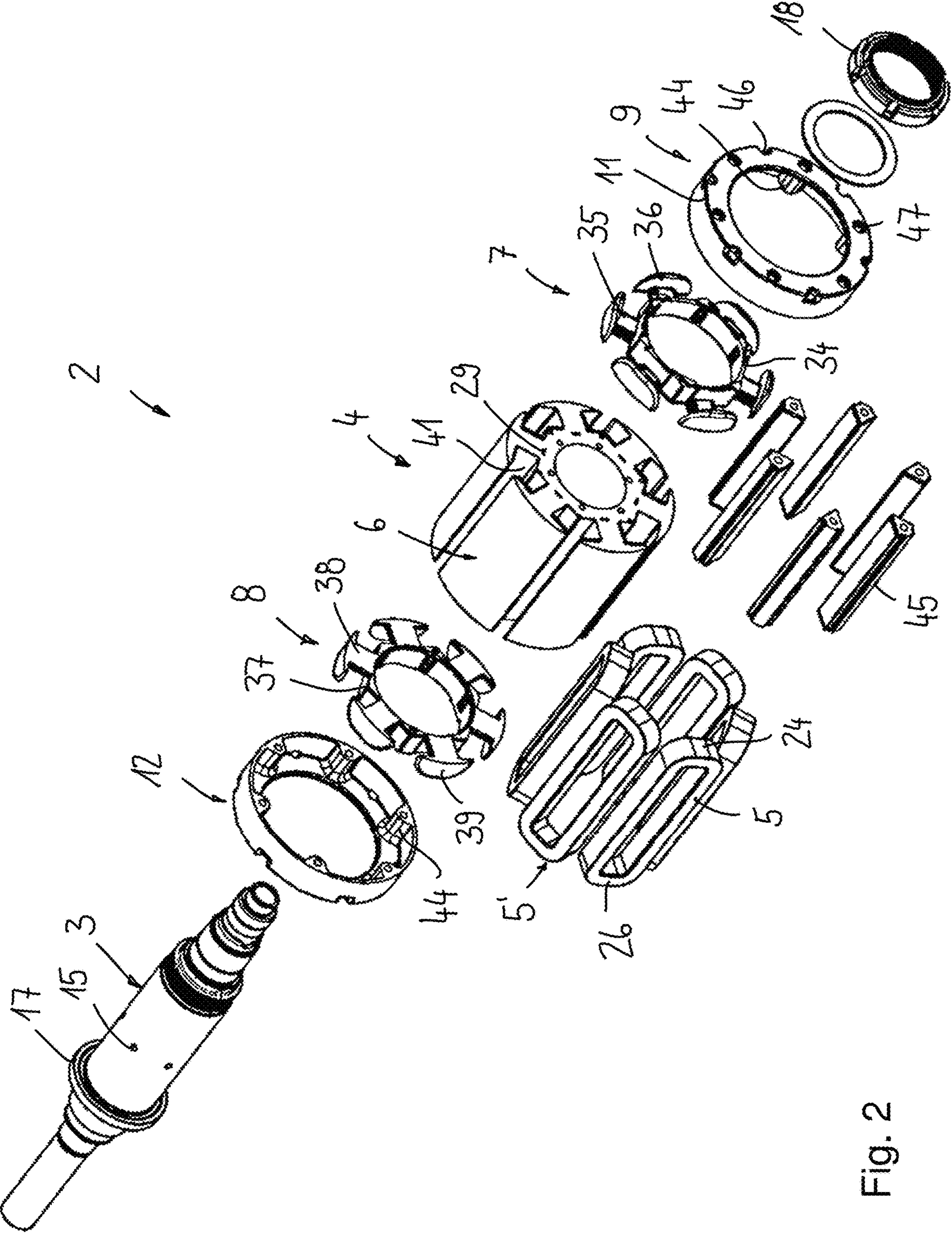
FIG. 2 shows the rotor assembly of FIG. 1A in a three dimensional exploded view.
Figures 3A, 3B:
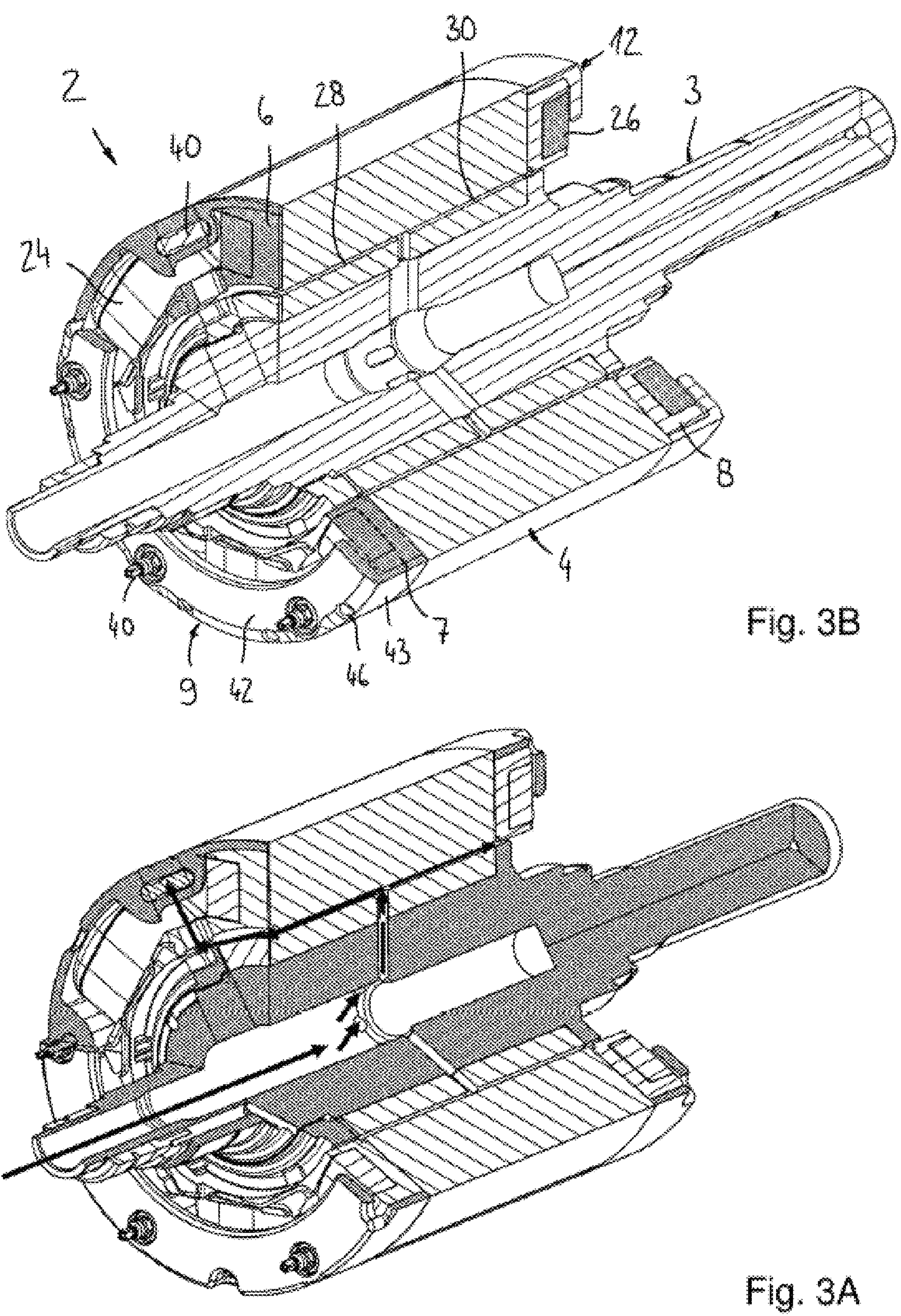

FIGS. 1A to 6D, which will be jointly described below, show an exemplary rotor assembly 2 for an electric machine 2 such as an electric excited synchronous motor (EESM).

The rotor assembly 2 comprises a rotor shaft 3, a rotor core 4 connected to the rotor shaft 3, windings 5 received on pole portions 6 of the rotor core 4 and a fluid guide element 7, 8 at each axial end of the rotor core 4. A first end ring 9 can be provided at a first axial end 10 of the rotor core and a second end ring 12 at the opposite second axial end 13 of the rotor core. The rotor shaft 3 comprises an axial bore 14 and a group of radial bores 15.

In the installed state of the rotor assembly, a supply element can be provided (not shown) that can axially extend into the axial bore 14 of the rotor shaft 3. The supply element can be configured in form of a static lance, for example, that can be connected to a housing or carrier portion of the housing. Compared to a rotary lance, the oil flow inside the static lance is not influenced by the rotational speed of the electric machine. No centrifugal force will be present inside the static lance, allowing a good control of the oil flow towards and into the shaft.

In the axial regions of the radial bores 15, the rotor shaft 3 can optionally have an annular recess 16 at the inner circumferential face. Cooling fluid flowing along the inner wall of the axial bore 14 by centrifugal forces thus reaches the openings of the radial bores 15 very easily, which are radially set back compared to the radius of the end portions of the inner shaft wall. The group of radial bores 15 can be arranged in one plane P, as shown in FIGS. 1A and 1B, without being limited thereto. The radial bores 15 are arranged in particular in the central region of the rotor shaft 3. More specifically, at least some of the radial bores 15 are arranged in a plane P that is axially within a middle section of the rotor core 4, in particular a middle third of the rotor core, for example exactly in the middle of the rotor core.

The rotor core 4 is firmly connected to the rotor shaft 3. An axial connection can be provided by the rotor core 4 being axially supported against a flange portion 17 of the rotor shaft 3 at one end, and being axially clamped by a sleeve 18 threaded onto the rotor shaft 3 at the opposite end. A rotationally fixed connection can be provided by a force-locking engagement, such as an intermediate fit, between the rotor shaft 3 and the rotor core 4, and/or a form-locking engagement, such as a splined connection. The rotor core 4 includes a plurality of axially extending recesses 41 at a radially outer section of the rotor core, with pole portions 6, 6' formed respectively between two circumferentially adjacent recesses 41. The recesses 41 may also be referred to as slots.

Each of the pole portions 6, 6' carries a winding 5, 5' surrounding the respective pole with a closed loop, as can be seen in particular in FIG. 2. Thus, the pole portions can also be referred to as winding carrier or salient poles. In a cross-sectional view, as shown in FIGS. 1B and 1C, the winding carrier can have a T-form, with a radial portion 22 and a head portion 23 widened relative thereto in circumferential direction. The T-form contributes to a secure positioning of the windings 5, 5' even at high rotational speeds and prevent the windings from escaping off the winding carrier due to centrifugal forces. The windings 5, 5', that can also be referred to as coils, each include a first winding end 24 that extends axially beyond the first end face 25 of the rotor core and, on the opposite side, a second winding end 26 that project axially beyond the second end face 27 of the rotor core 4. The winding ends 24, 25 form U-shaped return portions of the windings. The windings 5, 5' carried by the rotor core 4 create a constant magnetic field. Thus, in an activated condition, the rotor core 4 is rotated about the axis of rotation A to drive the rotor shaft 3 and a driveline rotatably connected thereto.

At a radial inner circumferential face 20, the rotor core 4 includes a plurality of inlet openings 19 that are fluidically connected to the radial bores 15 of the rotor shaft 3. For this, the inlet openings 19 of the rotor core 4 can be arranged in line with the radial outlet openings of the rotor shaft 3. The inlet openings 19 may extend radially up to axial channels connected therewith. First axial channels 28 extend from the inlet openings 19 axially to first outlet openings 29 at the first end face 25 of the rotor core 4, and second axial channels 30 extend to second outlet openings 31 at the second end face 27 of the rotor core.

The rotor core 4 can be formed of a plurality of stacks of laminations. A central set of rotor laminations comprise the inlet openings 19, as can be seen in FIGS. 1A and 1B. The rotor laminations arranged axially adjacent the central laminations can have the same configuration among each other, as shown in FIG. 1C. The stacks of laminations form the axially extending channels 28, 30. The axial channels 28, 30 extend through all the laminated stacks to the axial ends 25, 27 of the rotor core 4. From the middle section of the rotor core 4, part of the cooling fluid flows in the first axial direction to the first side 10, and part of the cooling fluid flows in the opposite second axial direction to the second side 13, thereby absorbing heat from the rotor core 4.

As can be seen in FIGS. 1B and 1C, the number of radial bores 19 and axial channels 28, 30 of the rotor core 4 corresponds with the number of windings 5, 5' of the rotor assembly 2. In the present example, the axial channels 28, 30 are arranged circumferentially in the region of the pole portions 6, 6', an/or windings 5, 5'. Furthermore, the axial channels 28, 30 are arranged radially between the inner circumferential face 20 of the rotor core and a radial inner end 21 and/or shoulder of the pole portions 6, 6' where the windings 5, 5' are received. However, it is to be understood that the number and arrangement of the radial and axial channels could differ from the example shown here.

The first fluid guide element 7 and second fluid guide element 8 are arranged to axially contact the end faces 25, 27 of the rotor core. The fluid guide elements 7, 8 can be connected to the rotor core 4 via the first and second end rings 9, 12 which are clamped to the rotor core 4. In the present example, the first and second fluid guide elements 7, 8 have the same design, so that the features described for one element also apply for the other one. The first fluid guide element 7 is fluidically connected to the first outlet openings 29 of the rotor core 4 and comprises a fluid structure 32 configured to receive and guide cooling fluid to first escape openings 33 arranged in circumferential direction between two circumferentially adjacent end windings 5, 5'.

Figures 4, 5A, 5B, 5C, 5D:
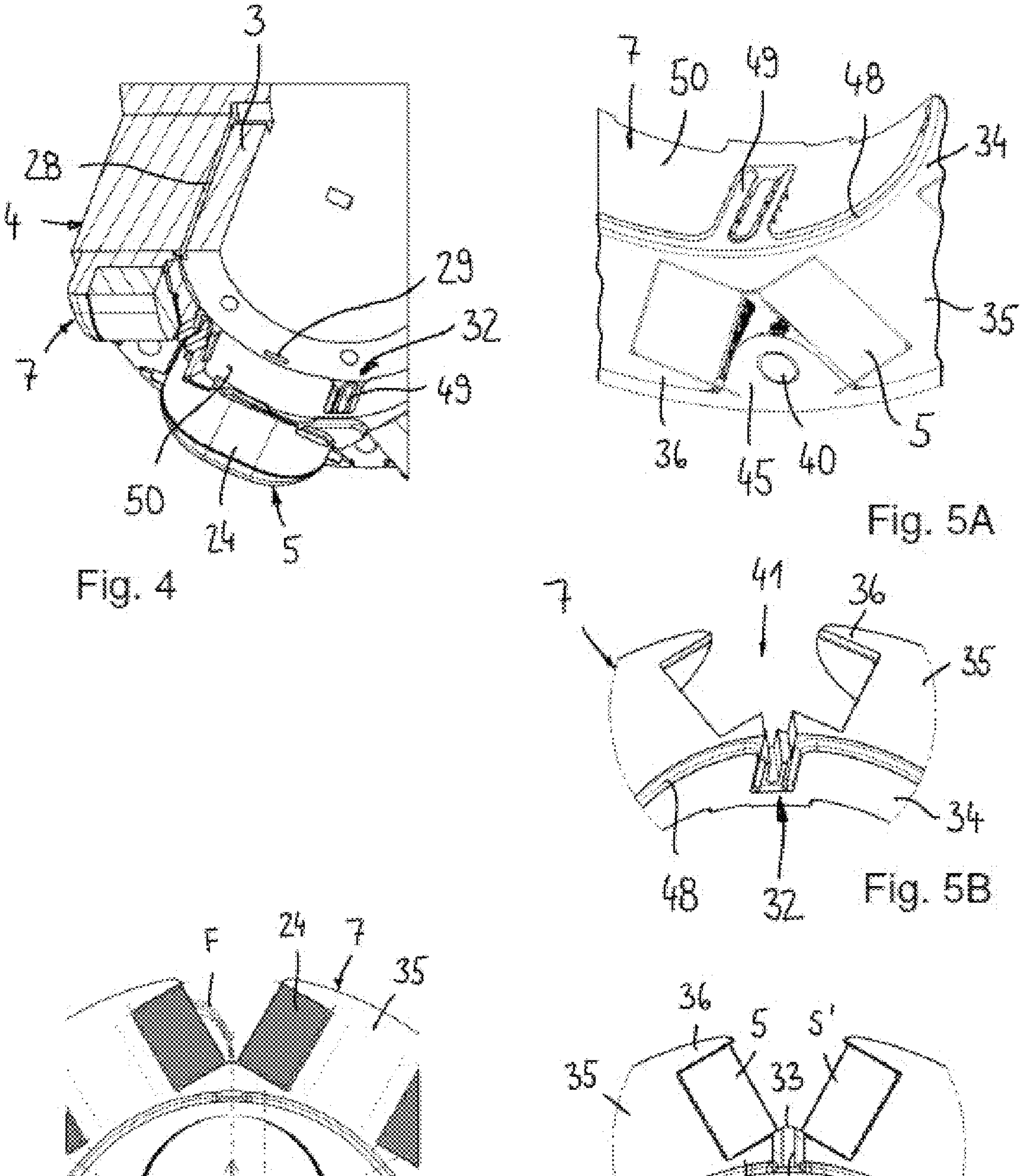
Figures 6A, 6B, 6C, 6D:
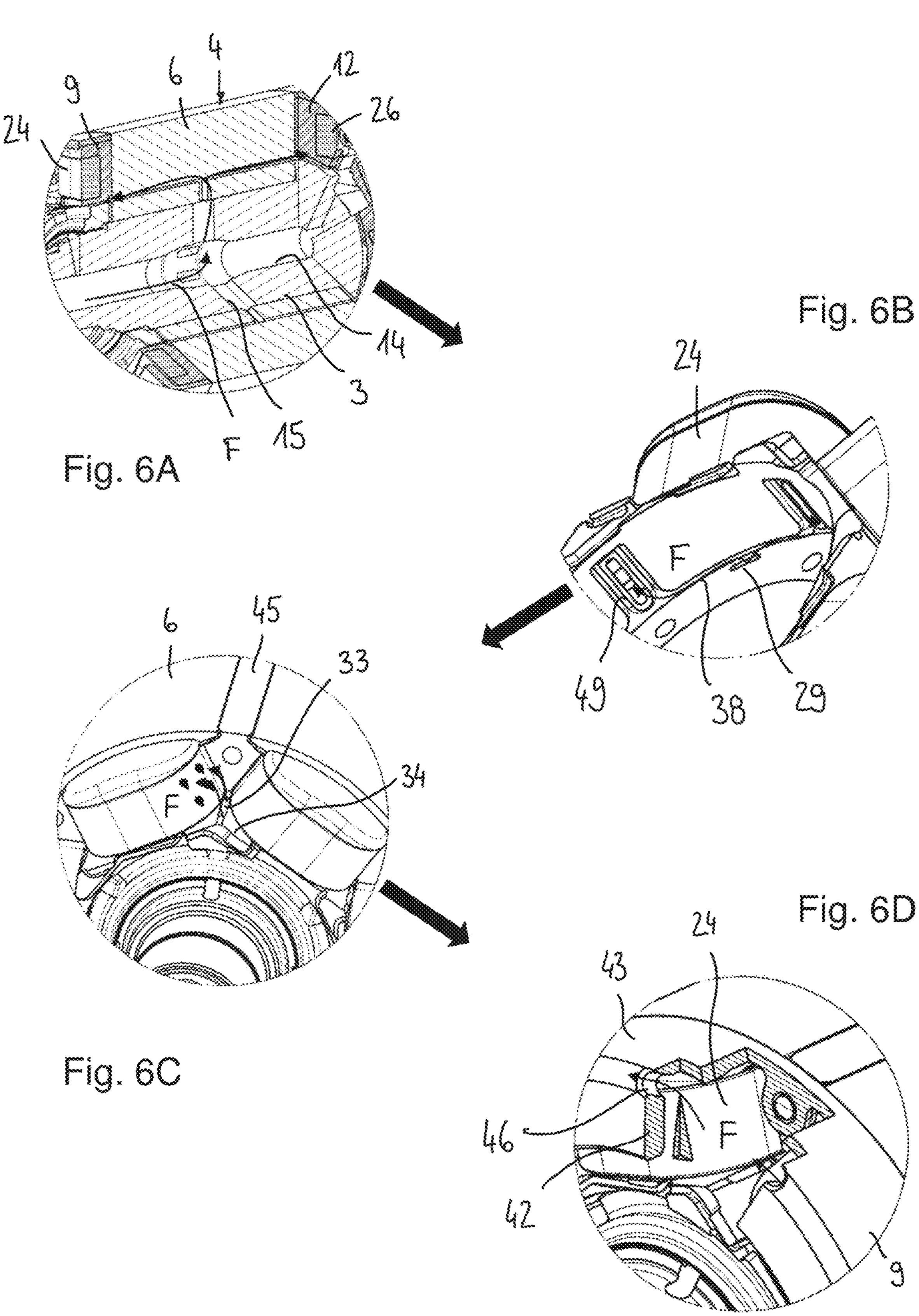
FIG. 6A shows a first detail of a flow path F of the rotor assembly of FIG. 1A in a perspective view, partially cut.
FIG. 6B shows a second detail of a flow path F of the rotor assembly of FIG. 1A in a perspective view, partially cut.
FIG. 6C shows a third detail of a flow path F of the rotor assembly of FIG. 1A in a perspective view, partially cut.
FIG. 6D shows a fourth detail of a flow path F of the rotor assembly of FIG. 1A in a perspective view, partially cut.

More specifically, the fluid guide element 7, 8 includes a ring portion 34 and a plurality of winding support portions 35 radially projecting from the ring portion. As can be seen in FIGS. 5A to 5C, the ring portion 34 includes, at an axial end contacting the adjacent end face 25, 27 of the rotor core 4, an annular channel 48 and a plurality of fluid pockets 49 fluidically connected to the annular channel and arranged at an inner circumferential face 50 of the fluid guide element 7, 8. The annular channel 48 is configured so as to receive cooling fluid from the adjacent outlet openings 29 of the rotor core. For this, the annular channel 48 of the fluid guide element 7, 8 can be arranged with a radial overlap relative to the side openings 29 of the rotor core channels. Thus, cooling fluid exiting the axial channels 28, 30 gathers in the annular channel 48 of the respective fluid guide element 7, 8, with a ring-shaped pool of cooling fluid formed by the annular channel 48. The ring-shaped pool is fluidically connected to the fluid pockets 49, which respectively form an axial reservoir to centrifugally collect the cooling fluid before releasing it outwards by overflow through radial bores 51 that extend through the ring portion 34 of the fluid guide element 7, 8. The radial bores 51 fluidically connect the radial inner fluid pockets 49 with the radial outer escape openings 33. The radial bores 51 and/or escape openings 33 have an axial extension that is in particular at least 0.5 times, more particularly at least 0.75 times the axial length of the end windings 24, 26 projecting from the end face of the rotor core. The so formed slot-like design contributes, in connection with the reservoir-design, to an axially wide oil cascade of cooling fluid towards the winding ends 24, 26 of the rotor, as shown in FIG. 5D.

The winding support portions 35 include head portions 36 forming enlarged ends, so that the end windings 24, 26 are prevented from slipping off the support portions 35 due to centrifugal forces. The end windings 24, 26 embrace the winding support portions 35, 38 in a U-form in a radial view. The winding support portions 35, 38 can be formed, in a cross-sectional view, corresponding to the pole portions 6, 6' of the rotor core 4, i.e., so as to form a lateral extension of the pole portions 6, 6' at the axial ends of the rotor core. The windings 5, 5' extend respectively in a closed loop around the associated pole portions 6, 6' of the rotor core, the first winding support portion 35 of the first fluid guide 7 element and, at the opposite end, around the second winding support portion 38 of the second fluid guide element 8. The fluid guide elements contribute to a good cooling and support of the end windings 24, 26. The fluid guide elements 7, 8 can be made of a non-conducting material, in particular a plastic material.

The first end ring 9 is provided at the first side 10 of the rotor core, and the second end ring 12 is provided at the opposite second side 13. The end rings 9, 12 can be made of a metal material, in particular aluminium or an aluminium alloy. The end rings 9, 12 are mechanically connected to the rotor core 4 by being axially clamped towards each other by a plurality of clamping elements 40 distributed over the circumference. As can be seen in FIGS. 1B and 1C, the clamping elements 40 are arranged circumferentially in a region between two adjacent windings 5, 5'.

The first and second end rings 9, 12 can have the same design, so that the features described for one ring can also apply for the other one. The end rings 9, 12 can comprise a flange portion 42 against which the tensioning elements 40 are axially supported, and a jacket portion 43 that substantially encloses the respective end windings 24, 26. As can be seen in particular in FIG. 2, the end rings 9, 12 comprise a plurality of ribs 44, respectively land portions extending axially along on a radial inner circumference of the jacket portion 43. The land portions are axially supported against wedge elements 45 arranged in the slots 41 of the rotor core 6. The tensioning members 40 extend axially through the ribs 44 of the opposite end rings 9, 12 and the wedge elements 45 arranged axially therebetween. The groove wedges support the windings 5, 5' in circumferential direction and contribute to hold them in place even under high centrifugal forces.

The L-shaped form of the end rings 9, 12 with flange portion and jacket portion contribute to temporarily gather cooling fluid flung off the winding ends 24, 26. The end rings 9, 12 can include a plurality of holes 46 distributed across the circumference. The holes 46 can be arranged at the edge 11 between the flange portion and jacket portion. In circumferential direction, the holes can be arranged between the openings 47 for the clamping members 40. By means of the holes 46, cooling fluid coming from the winding ends 24, 26 of the rotor assembly 2 can be directed towards the winding ends of a stator of the electric machine.

The flow path F of the cooling fluid from entering the rotor shaft 3 to exiting the end rings 9, 12 is shown in greater detail in FIGS. 6A to 6D.

Figures 7A, 7B:
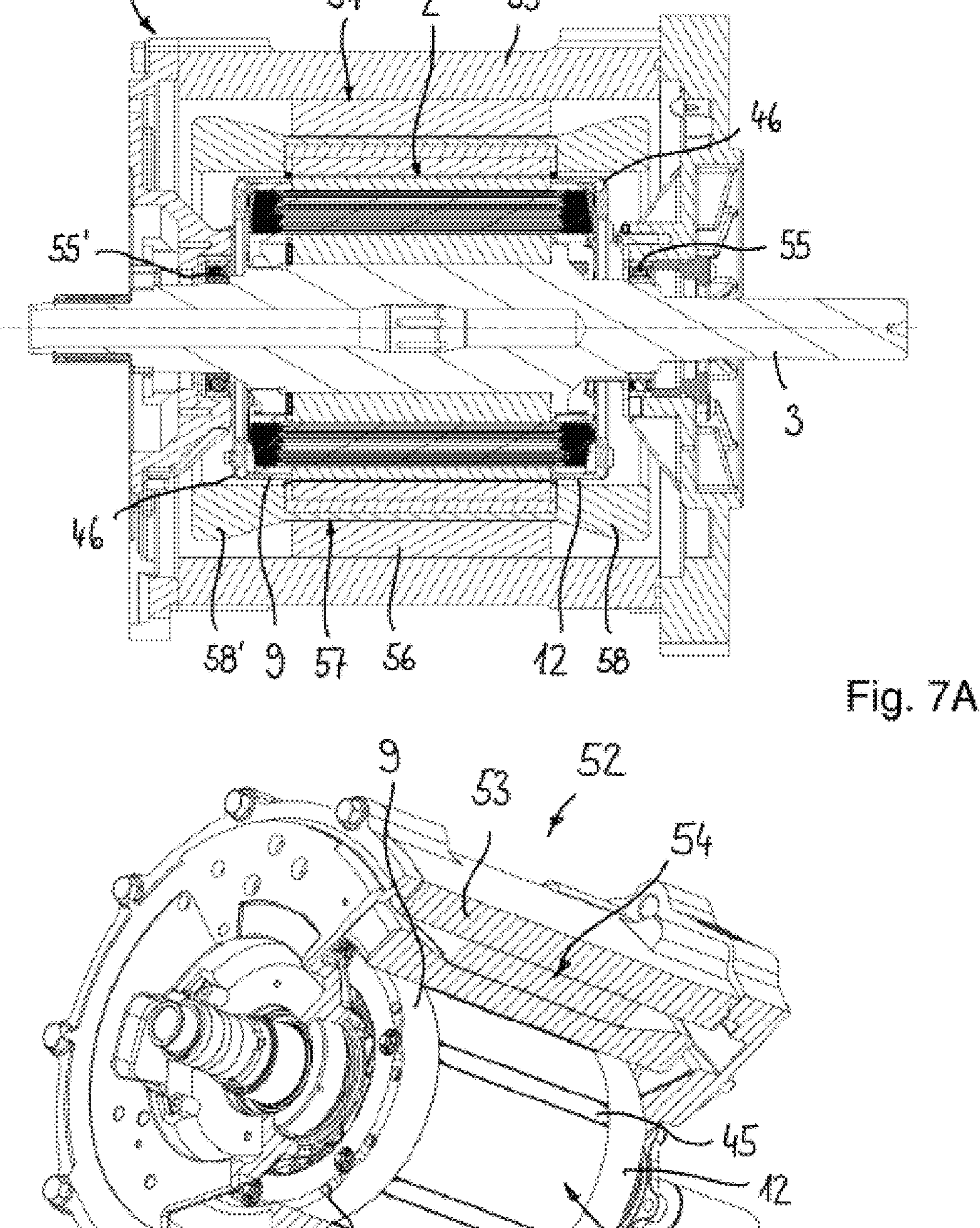
FIG. 7A shows an exemplary electric motor including a rotor assembly shown in FIGS. 1A-6D in a longitudinal section.
FIG. 7B shows the electric motor assembly of FIG. 7A in a partially cut perspective view.

FIGS. 7A and 7B show an exemplary electric machine 52 according with a rotor assembly as shown in FIGS. 1A to 6D. The electric machine 52 is configured in the form of an electric excited synchronous motor (EESM). It comprises a housing 53, a stator 54 connected to the housing 53 and a rotor assembly 2 as described above. The rotor assembly 2 is arranged coaxially to the stator 54 and is rotatably supported in the housing 53 about the axis of rotation by respective bearings 55, 55'. The stator 54 includes a stator core 56 and windings 57. The windings can be connected to an AC power supply to produce a rotating magnetic field.

It can be seen that the holes 46 of the end rings 9, 12 are arranged radially inside the winding ends 58, 58' of the stator windings 57, with an axial overlap. In this way, cooling fluid flowing from the winding ends 24, 26 to the end rings 9, 12 of the rotor assembly 2 can flow through the holes 46 radially outside to cool the winding ends 58, 58' of the stator 54. This contributes to an overall efficient electric machine.

It is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but rather with reference to claims appended hereto and/or included in a non-provisional patent application based hereon, along with the full scope of equivalents to which such claims are entitled. It is anticipated and intended that future developments will occur in the arts discussed herein, and that the disclosed apparatus, systems, and methods will be incorporated into such future embodiments. In sum, it should be understood that the disclosed subject matter is capable of modification and variation.

| Reference Numerals | |
|---|---|
| 2 | rotor assembly |
| 3 | rotor shaft |
| 4 | rotor core |
| 5 | winding |
| 6 | pole portion |
| 7 | first fluid guide element |
| 8 | second fluid guide element |
| 9 | first end ring |
| 10 | first axial end |
| 11 | edge |
| 12 | second end ring |
| 13 | second axial end |
| 14 | axial bore |
| 15 | radial bore |
| 16 | annular recess |
| 17 | flange portion |
| 18 | threaded sleeve |
| 19 | inlet opening |
| 20 | circumferential face |
| 21 | radial inner end |
| 22 | radial portion |
| 23 | head portion |
| 24 | first winding end |
| 25 | first end face |
| 26 | second winding end |
| 27 | second end face |
| 28 | first axial channels |
| 29 | first outlet openings |
| 30 | second axial channels |
| 31 | second outlet openings |
| 32 | fluid structure |
| 33 | escape openings |
| 34 | first ring portion |
| 35 | first winding support portion |
| 36 | first head portions |
| 37 | second ring portion |
| 38 | second winding support portion |
| 39 | second head portions |
| 40 | clamping member |
| 41 | winding groove |
| 42 | flange portion |
| 43 | jacket portion |
| 44 | ribs |
| 45 | wedge elements |
| 46 | outlet opening |
| 47 | opening |
| 48 | annular channel |
| 49 | fluid pocket |
| 50 | Inner circumferential face |
| 51 | bore |
| 52 | electric machine |
| 53 | housing |
| 54 | stator |
| 55, 55' | bearing |
| 56 | stator core |
| 57 | windings |
| 58, 58' | winding ends |
| A | axis |
| F | flow |
| P | plane |

The invention claimed is:

1. A rotor assembly for an electric excited synchronous motor (EESM), comprising:

a rotor shaft, a rotor core connected to the rotor shaft and including a plurality of circumferentially distributed pole portions, with respective windings being received around the pole portions, wherein the windings have first winding ends that project axially from a first end face of the rotor core and, on the opposite side, second winding ends that project axially from a second end face of the rotor core;

a first fluid guide element arranged at a first end of the rotor core;

a second fluid guide element arranged at a second end of the rotor core;

wherein the rotor shaft comprises an axial bore and, extending therefrom, a plurality of radial bores arranged in an axially central region of the rotor shaft;

wherein the rotor core includes a plurality of inlet openings that are fluidically connected to the radial bores of the rotor shaft, and axial channels that extend from the inlet openings axially to first outlet openings at the first end face of the rotor core and to second outlet openings at the second end face of the rotor core;

wherein the first fluid guide element is fluidically connected to the first outlet openings of the rotor core and comprises a fluid structure that is configured to receive cooling fluid from the first outlet openings of the rotor core and guide the cooling fluid to first escape openings arranged in circumferential direction between two circumferentially adjacent first winding ends; and wherein the second fluid guide element is fluidically connected to the second outlet openings of the rotor core and comprises a fluid structure that is configured to receive cooling fluid from the second outlet openings of the rotor core and guide the cooling fluid to second escape openings arranged in circumferential direction between two circumferentially adjacent second winding ends;

wherein the first fluid guide element includes a first ring portion and a plurality of first winding support portions radially projecting from the first ring portion, with first head portions forming enlarged ends of the first winding support portions, wherein the first end windings embrace the first winding support portions; and wherein the second fluid guide element includes a second ring portion and a plurality of second winding support portions radially projecting from the second ring portion, with second head portions forming enlarged ends of the second winding support portions, wherein the second end windings embrace the second winding support portions.

2. The rotor assembly of claim 1, further comprising a supply element to direct cooling fluid into the axial bore of the rotor shaft.

3. The rotor assembly of claim 1, wherein at least some of the plurality of radial bores of the rotor shaft are arranged in a plane that lies axially within a central portion of the rotor core.

4. The rotor assembly of claim 1, wherein the number of radial bores and axial channels of the rotor core corresponds with the number of pole portions.

5. The rotor assembly of claim 1, wherein the axial channels are arranged radially inside the pole portions that receive the windings.

6. The rotor assembly of claim 1, wherein the first fluid guide element includes a first annular channel fluidically connected with the first outlet openings of the rotor core, and, at an inner circumferential face of the first fluid guide element, a plurality of first fluid pockets fluidically connected to the first annular channel, wherein the first escape openings are fluidically connected with the first fluid pockets respectively; and/or wherein the second fluid guide element includes a second annular channel fluidically connected with the second outlet openings of the rotor core, and, at an inner circumferential face the second fluid guide element, a plurality of second fluid pockets fluidically connected to the second annular channel, wherein the second escape openings are fluidically connected with the second fluid pockets respectively.

7. The rotor assembly of claim 6, wherein the first escape openings of the first fluid guide element have an axial extension that is at least 0.25 times an axial length of the first end windings projecting from the first end face of the rotor core; and wherein the second escape openings of the second fluid guide element have an axial extension that is at least 0.25 times an axial length of the second end windings projecting from the second end face of the rotor core.

8. The rotor assembly of claim 1, wherein at least one of the first fluid guide element and the second fluid guide element is made of a non-conducting material that is different from a material of the rotor core.

9. The rotor assembly of claim 1, wherein a first end ring is provided at the first side of the rotor core and a second end ring is provided at the opposite second side, wherein the first end ring and the second end ring are clamped axially against each other by a plurality of clamping elements respectively extending between two circumferentially adjacent windings; and wherein at least one of the first end ring and the second end ring comprises a flange portion for supporting the clamping elements and a jacket portion surrounding the end windings, wherein the end ring comprises a plurality of outlet openings.

10. The rotor assembly of claim 9, wherein the outlet openings of the first and second end ring are arranged circumferentially offset relative to the escape openings of the respective fluid guide element.

11. The rotor assembly of claim 9, wherein at least one of the first and second end ring includes a plurality of ribs that extend axially between two circumferentially adjacent end windings.

12. The rotor assembly of claim 9, wherein the end ring is made of non-ferromagnetic material.

13. The rotor assembly of claim 1, wherein winding slots are formed in the rotor core respectively between two pole portions adjacent in circumferential direction, with a wedge element arranged respectively between two windings adjacent in circumferential direction.

14. The rotor assembly of claim 1, in an electric excited synchronous motor (EESM) comprising:

a housing, a stator arranged in the housing and comprising a stator core and windings, wherein the rotor assembly is rotatably supported in the housing about an axis of rotation.

15. A rotor assembly for an electric excited synchronous motor (EESM), comprising:

a rotor shaft, a rotor core connected to the rotor shaft and including a plurality of circumferentially distributed pole portions, with respective windings being received around the pole portions, wherein the windings have first winding ends that project axially from a first end face of the rotor core and, on the opposite side, second winding ends that project axially from a second end face of the rotor core;

a first fluid guide element arranged at a first end of the rotor core;

a second fluid guide element arranged at a second end of the rotor core;

wherein the rotor shaft comprises an axial bore and, extending therefrom, a plurality of radial bores arranged in an axially central region of the rotor shaft;

wherein the rotor core includes a plurality of inlet openings that are fluidically connected to the radial bores of the rotor shaft, and axial channels that extend from the inlet openings axially to first outlet openings at the first end face of the rotor core and to second outlet openings at the second end face of the rotor core;

wherein the first fluid guide element is fluidically connected to the first outlet openings of the rotor core and comprises a fluid structure that is configured to receive cooling fluid from the first outlet openings of the rotor core and guide the cooling fluid to first escape openings arranged in circumferential direction between two circumferentially adjacent first winding ends;

wherein the second fluid guide element is fluidically connected to the second outlet openings of the rotor core and comprises a fluid structure that is configured to receive cooling fluid from the second outlet openings of the rotor core and guide the cooling fluid to second escape openings arranged in circumferential direction between two circumferentially adjacent second winding ends; and wherein at least one of the first fluid guide element and the second fluid guide element is made of a non-conducting material that is different from a material of the rotor core.

16. A rotor assembly for an electric excited synchronous motor (EESM), comprising:

a rotor shaft, a rotor core connected to the rotor shaft and including a plurality of circumferentially distributed pole portions, with respective windings being received around the pole portions, wherein the windings have first winding ends that project axially from a first end face of the rotor core and, on the opposite side, second winding ends that project axially from a second end face of the rotor core;

a first fluid guide element arranged at a first end of the rotor core;

a second fluid guide element arranged at a second end of the rotor core;

wherein the rotor shaft comprises an axial bore and, extending therefrom, a plurality of radial bores arranged in an axially central region of the rotor shaft;

wherein the rotor core includes a plurality of inlet openings that are fluidically connected to the radial bores of the rotor shaft, and axial channels that extend from the inlet openings axially to first outlet openings at the first end face of the rotor core and to second outlet openings at the second end face of the rotor core;

wherein the first fluid guide element is fluidically connected to the first outlet openings of the rotor core and comprises a fluid structure that is configured to receive cooling fluid from the first outlet openings of the rotor core and guide the cooling fluid to first escape openings arranged in circumferential direction between two circumferentially adjacent first winding ends;

wherein the second fluid guide element is fluidically connected to the second outlet openings of the rotor core and comprises a fluid structure that is configured to receive cooling fluid from the second outlet openings of the rotor core and guide the cooling fluid to second escape openings arranged in circumferential direction between two circumferentially adjacent second winding ends;

wherein a first end ring is provided at the first side of the rotor core and a second end ring is provided at the opposite second side, wherein the first end ring and the second end ring are clamped axially against each other by a plurality of clamping elements respectively extending between two circumferentially adjacent windings; and wherein at least one of the first end ring and the second end ring comprises a flange portion for supporting the clamping elements and a jacket portion surrounding the end windings, wherein the end ring comprises a plurality of outlet openings.

* * * * *